Dec. 4, 1956  J. A. CLARK, JR  2,772,625
EXHAUST DEVICE

Filed June 15, 1953  2 Sheets-Sheet 1

INVENTOR:
JOHN A. CLARK, JR
BY
John D. Wilkins
ATTORNEY

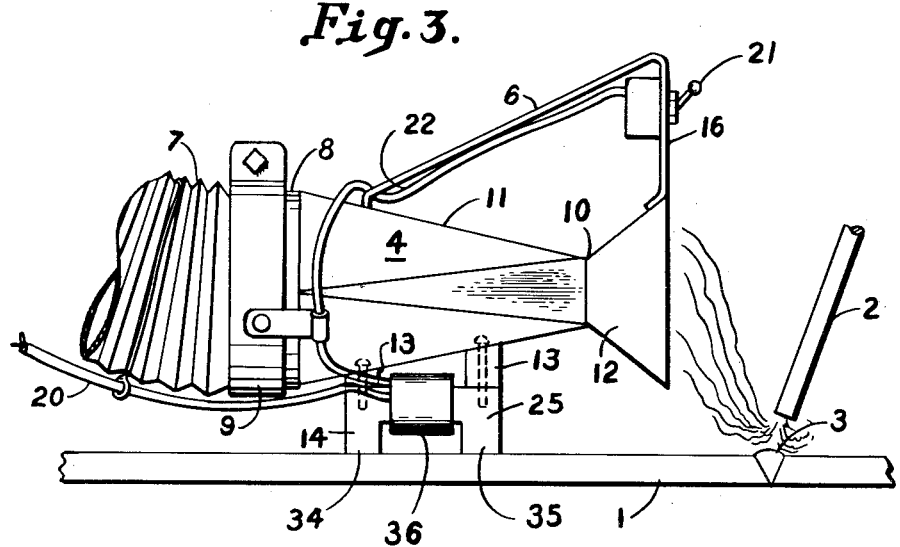

United States Patent Office 2,772,625
Patented Dec. 4, 1956

2,772,625
EXHAUST DEVICE

John A. Clark, Jr., Wood River, Ill., assignor to Olin Mathieson Chemical Corporation, a corporation of Virginia Application June 15, 1953, Serial No. 361,455

3 Claims. (Cl. 98—115)

This invention relates to a ventilation nozzle and more particularly to improvements in such nozzles serving to draw off obnoxious or harmful smoke and fumes generated in various industrial processes. For example, during either gas or electric welding and during flame cutting, heated gases, fumes and smoke are usually evolved and frequently in considerable quantity much to the discomfort of the welders, especially when the welding process is carried on indoors.

Since the fumes or smoke not only interfere with the welding operators' breathing and distract them from the work but may also have a deleterious effect in time on the health of those engaged in the occupation, many welding installations include some type of fume exhaust system with ducting having smoke collecting intakes. For most effective collection it is desirable that the particular intake in use be positioned as close as possible to the joint being welded. While large intakes in permanent locations may tend to clarify the air in the welding establishment, at the weld little, if any, improvement is realized by the operator. Effective distribution of the intakes in the vicinity of the welding operation is not easily accomplished because welding as a rule does not involve work in the same limited area at the same angle but instead involves work pieces of complex configuration and varying shapes and dimensions; and as a consequence permanent positioning of the intakes of the ventilation system with respect to the work is seldom satisfactory. For one thing, as the welding operation progresses over the work area, often at difficult and changing angles, welding with the gas evolution is occurring most of the time away from the area swept by the fixed intakes. If the intakes are enlarged to affect a large area in the fashion of a smoke hood, then unusually severe drafts and other undesirable effects are created and expensive installations are required.

As a move toward correction of this situation movable or portable fume collecting hoods or nozzles have been utilized together with flexible conduit or hose for carrying the fumes from the nozzle, wherever it be located, to a stationary exhaust system header for disposal. But provision of portable fume collecting nozzles of such prior design has not been an entirely satisfactory solution to the problem of effective local removal of fumes and smoke. The chief reason for the ineffectiveness of heretofore known types of portable nozzles is that while movement of these nozzles may be a simple matter, their placement is not readily accomplished. Placement requires unsecuring the nozzle from the old position and securing it in a subsequent position which cannot be done conveniently at frequent intervals with the adjustable supporting means commonly employed such as clamps, hangers or standards. Other supporting systems such as those using counterbalancing with cords, pulleys, levers, springs, weights and the like suffer from limitation as to reach, or adjustability, or retention of a desired position when inadvertently brushed as the work, the welder and the welding apparatus, such as the cables, are moved about. No small part of the failure of heretofore known designs of fume collectors has been the justifiable intolerance of welders toward any such devices, the unreliability and unhandiness of which outweighed by far what little good they may have done and resulted in their early disuse in spite of the discomfort and hazards of continued exposure to fumes. Furthermore these prior devices include costly pieces of mechanical equipment often requiring considerable maintenances.

Therefore an object of this invention is to provide a new portable fume collecting nozzle having improved means for attachment free from the disadvantages of prior devices used for the purpose. Another object is the provision of a portable nozzle that may be conveniently attached to any suitable metallic surface such as iron welding tables, holders, supports, or work clamps and the steel plate commonly employed in welding operations. Another object of the invention is to provide a self supporting and clamping nozzle of simple and inexpensive construction but strong, compact, reliable and efficient for the intended purpose. A still further object is to provide a fume exhaust nozzle having holding means for properly and removably positioning the nozzle with respect to the work whereby firm but adjustable support and positioning of the nozzle is obtainable at frequent intervals for most effective removal of the fumes without impeding the work unduly. Another object is to provide a portable fume nozzle of improved construction.

Other objects will be understood from the description which follows and the accompanying drawing, in which:

Figure 1 is an elevational side view of one embodiment of this invention shown attached to a steel plate 1 in position near welding rod 2 for withdrawing the fumes evolved at the weld 3;

Figure 3 is an elevational side view of another embodiment.

Figure 1:
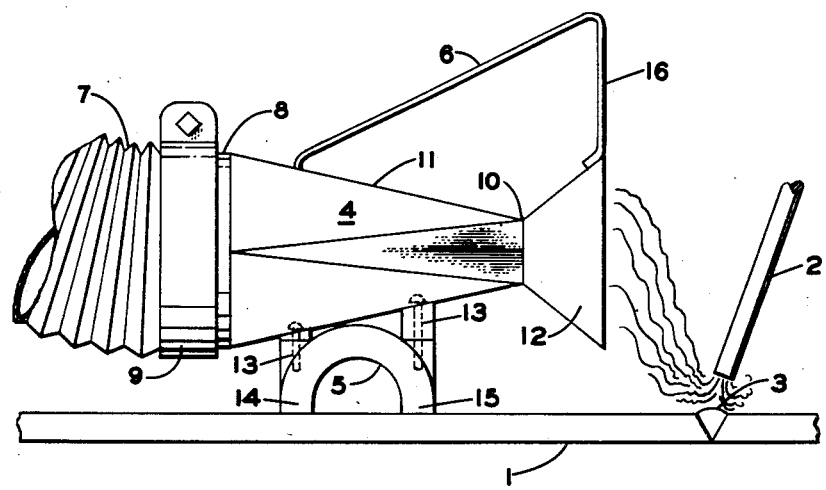
Figure 2:
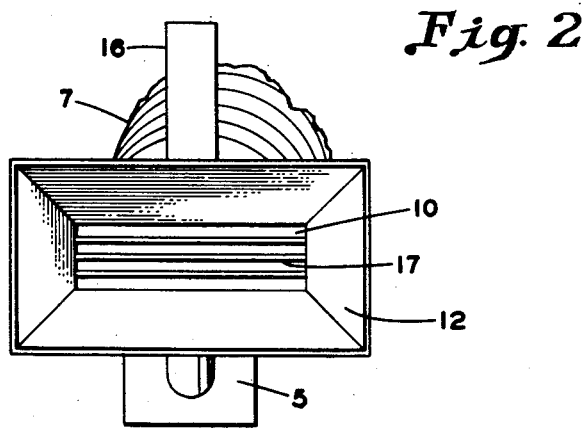
Figure 2 is an elevational front view of the embodiment shown in Figure 1.

The foregoing objects are achieved in accordance with this invention generally by provision of a portable nozzle structure having a magnetic immobilizing or attaching means. A permanent magnet made of a material such as "Alnico" or the like and characterized by a high magnetic flux and attraction force as compared to the weight of the magnetic material is contemplated. However any magnetic material or magnet structure found suitable for the purpose may be used. Furthermore the magnetically attachable nozzle structure is provided preferably with an erect handle for ease of adjustment and location. By an erect handle is meant a handle which protrudes perpendicularly from the surface of attachment which is usually the work surface.

The embodiment herein described and shown in the drawing consists of nozzle portion 4, a permanent magnet 5 and a handle 6. Connected to the fume exhaust nozzle is a length of flexible hose or duct 7 for carrying away the fumes and smoke collected. The nozzle portion 4 has a discharge opening or sleeve section 8 of a circular shape adaptable for attachment to the flexible hose 7 by any suitable means such as clamp 9. Opposite sleeve section 8 is an orifice 10. Between opening 8 and orifice 10 is a suitable reducer section or body 11. Orifice 10 is of elongated rectangular shape and of a cross sectional area less than that of the discharge opening 8 so as to form a restriction for creation of a desirable low pressure-high air speed region over a considerable length of space such that the orifice is adapted to advantageously provide suction over an appreciable part of the length of a seam weld, for example. Surrounding the orifice 10 is a flared hood section or funnel mouth 12 which serves to funnel the fume laden atmosphere at the weld into the orifice 10 with a minimum of surrounding air back of the orifice which was found to be the situation without the funnel mouth 12. A grate 17 may be provided in the throat of orifice 10 to prevent intake of large objects such as rags or paper which might clog up the nozzle or the associated duct system.

A U-shaped magnet 5 is fixed on the body 11 by any suitable means such as threaded fasteners 13 in such a way that the poles 14 and 15 of the magnet 5 protrude away from the confines of the body and other parts of the nozzle sufficiently for engagement with any ferrous surface such as steel plate 1. A magnet of the permanent type is prefered so as to obviate the necessity for use of cords. Magnet 5 is positioned on one of the wide sides of the reducer section 11 of nozzle 4 so as to locate one of the long sides of the orifice 10 adjacent the work surface for the most effective collection of fumes from the vicinity of the work. It is desirable that the magnet be located on body 11 of the nozzle near the point of the center of gravity of the nozzle-flexible duct system so as to minimize the turning or releasing influence of undesired forces of imbalance.

Attached to the fume nozzle at a couple of points, one on body 11 and the other on the flared hood section 12 opposite the location of magnet 5, is handle 6, which in any event has an upright or erect section 16 fastened on section 12 with suitable displacement from magnet 5 so as to provide for application of manual force with leverage for easy release of the magnet 5 from the steel plate 1 whenever a change of nozzle position is desired. Furthermore, the erect handle section 16 and its location at the nozzle mouth 12 make for ease of manipulation of the nozzle because the erect section 16 projects perpendicularly and sufficiently from the work for optimum detectability with reference to that part of the nozzle the position of which is likely to be best known by the welding operators who are always working under the handicap of poor visibility because of the protective dark goggles and face hoods worn. At best the welders can see the work surface and the mouth section 12 of the nozzle; and with this in mind handle section 16 is so located and arranged in space with reference to section 12 that it is a simple matter to locate the handle by a mere swing of the arm and without the necessity of removing goggles or hood. The upright handle section 16 may be located at any point of the fume nozzle to project perpendicularly from the work or from any other surface of attachment, but the best location is a location at or very near the funnel mouth 12 of the nozzle.

Nozzle 4 and the entire handle 6 may be constructed of sheet metal of any kind, although a light metal such as aluminum is preferred. A one-piece thin die cast construction of aluminum-magnesium alloy or a one-piece construction molded from a suitable heat resistant silicone or organic plastic with or without glass fibre, cloth or metal screen reinforcement are also contemplated.

While the device of this invention has been described as including a permanent magnet, in another embodiment it may be constructed with a suitable electromagnet 25, having poles 34 and 35 and the magnetizing coil 36, and an electric cord or leads 20 associated with the flexible duct 7 and connecting such magnet to an energizing source. The associated cord 20 in this embodiment is supported to pass along either the interior or exterior of the flexible duct. When so constructed the portable nozzle includes, in the handle 6 for example, an easily operated electric switch, such as a large toggle switch 21 connected by line 22 with leads 20 and the coil 36, for controlling the electromagnet as the welder grasps the handle to adjust the position of the nozzle.

The utility and advantages of this invention for local fume and smoke collection are apparent; and the device may, of course, be used in accordance with this invention advantageously with gaseous operations other than welding.

While the foregoing is a description of what is now believed to be a preferred embodiment of the invention, it will be obvious to those skilled in the art that various changes and modifications may be made therein without departing from the spirit and scope of the invention as set forth in the appended claims.

What is claimed is:

1. A portable fume exhaust nozzle comprising a hollow body portion having at one end a narrow slot-like intake orifice elongated for collection of fume laden atmosphere over a linearly extending region of space and at the opposite end of said body portion an opening for discharging the collected fume to a flexible duct, a funnel mouth portion carried by said body portion and surrounding said elongated orifice, a permanent magnet mounted on one side of said body portion having poles projecting beyond the confines of said body and funnel mouth portions so that the poles are adaptable for attractive contact with a surface to which the nozzle is to be removably and adjustably attached near the source of fume evolution with an elongated dimension of said orifice nearest the surface, and disposed on the side of said body oppoiste said magnet a handle mounted on the nozzle and having an erect portion positioned adjacent said orifice and surrounding funnel mouth portion to project substantially perpendicularly away from the surface to which the nozzle is to be attached, said magnet being carried on said body portion and displaced from said handle so as to permit application of manual force by means of said handle with leverage on the magnet for removing the fume exhaust nozzle from the surface of attachment.

2. A portable fume exhaust nozzle for connection to the end of a flexible duct comprising a hollow body portion having an intake orifice for collection of fume laden atmosphere and a discharge opening for discharging the collected fume to the flexible duct, a funnel mouth portion carried by said body portion and surrounding said orifice, an electromagnet mounted on one side of said body portion having poles projecting beyond the confines of said body and funnel mouth portions so that the poles are adaptable for attractive contact with a surface to which the nozzle is to be removably and adjustably attached near the source of fume evolution, a handle mounted on the nozzle on the side of said body opposite said magnet and having an erect portion positioned adjacent said orifice and surrounding funnel mouth portion to project substantially perpendicularly away from the surface to which the nozzle is to be attached, lead wires carried on said flexible duct for connecting said electromagnet with an energizing source, and a manually operable electric switch carried in the erect portion of said handle.

3. A portable fume exhaust device comprising a light weight tubular portion having side walls tapering to form an elongated and narrow fume intake orifice at one end of said body portion and also having adjacent the opposite end of said body portion means for discharging the collected fume, said orifice having one of its long edges adjacent one of said side walls positionable in close proximity with at least a part of the locus of a progressively movable fume evolving metal welding instrumentality and adapted to collect said fumes, magnetic holding means mounted on one side of said body portion near the center of gravity of the device with its poles extending on the same side of said body portion as said long edge of the orifice for attaching said device upon the surface with said orifice positioned in close proximity with said instrumentality, and an upright extension attached to said body portion adjacent said orifice on the side opposite said edge and said magnet poles, said extension protruding in opposition to the extension of said poles for ready manual release of the device from adjacent a traversed portion of said locus and reattachment of the device adjacent the next succeeding portion of said locus.

(References on following page)

References Cited in the file of this patent

UNITED STATES PATENTS

| | | | |
|---|---|---|---|
| 855,888 | Hecker | June 4, | 1907 |
| 1,834,655 | Shaw | Dec. 1, | 1931 |
| 2,210,370 | Herrador | Aug. 6, | 1940 |
| 2,429,526 | Savon | Oct. 21, | 1947 |

FOREIGN PATENTS

| | | | |
|---|---|---|---|
| 227,196 | Switzerland | Aug. 16, | 1943 |
| 618,649 | Germany | Oct. 19, | 1934 |
| 982,779 | France | Jan. 31, | 1951 |
| 1,023,242 | France | Dec. 24, | 1952 |